（12) United States Patent
Almkvist et al.

(10) Patent No.: US 9,322,322 B2
(45) Date of Patent: Apr. 26, 2016

(54) TURBOCHARGER

(71) Applicant: VOLVO CAR CORPORATION, Gothenburg (SE)

(72) Inventors: Goran Almkvist, Lerum (SE); Jonas J Bjorkholtz, Karna (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/138,985

(22) Filed: Dec. 23, 2013

(65) Prior Publication Data

US 2014/0182286 A1  Jul. 3, 2014

(30) Foreign Application Priority Data

Dec. 28, 2012 (EP) .................................. 12199687

(51) Int. Cl.

| | |
|---|---|
| *F02B 33/44* | (2006.01) |
| *F02B 33/00* | (2006.01) |
| *F02B 37/10* | (2006.01) |
| *F02B 37/02* | (2006.01) |
| *F02B 37/20* | (2006.01) |
| *F02D 41/00* | (2006.01) |
| *F02B 21/00* | (2006.01) |
| *F02B 29/02* | (2006.01) |
| *F02D 41/10* | (2006.01) |

(52) U.S. Cl.
CPC ................. *F02B 37/10* (2013.01); *F02B 21/00* (2013.01); *F02B 29/02* (2013.01); *F02B 37/02* (2013.01); *F02B 37/20* (2013.01); *F02D 41/0007* (2013.01); *F02D 41/10* (2013.01); *Y02T 10/144* (2013.01); *Y02T 10/146* (2013.01)

(58) Field of Classification Search
CPC .......... F02B 21/00; F02B 21/02; F02B 29/02; F02D 41/0007; F02D 41/10; Y02T 10/144; Y02T 10/146
USPC ............................................................ 60/606
See application file for complete search history.

(56) References Cited

U.S. PATENT DOCUMENTS

| | | | | |
|---|---|---|---|---|
| 4,481,773 | A | * | 11/1984 | Sugito et al. .................... 60/606 |
| 4,674,283 | A | * | 6/1987 | Ishida et al. ..................... 60/606 |
| 5,630,395 | A | * | 5/1997 | Katoh et al. ............. 123/406.44 |
| 6,328,003 | B1 | * | 12/2001 | Gaertner et al. ............. 123/58.8 |
| 8,387,382 | B1 | * | 3/2013 | Dunn ............................... 60/606 |
| 2002/0100278 | A1 | * | 8/2002 | He et al. .......................... 60/600 |

(Continued)

FOREIGN PATENT DOCUMENTS

| | | |
|---|---|---|
| DE | 19833134 C1 | 11/1999 |
| DE | 102006027865 A1 | 12/2007 |

(Continued)

OTHER PUBLICATIONS

English Translation of DE 102007059145 A1.*

(Continued)

*Primary Examiner* — Thomas Denion
*Assistant Examiner* — Jessica Kebea
(74) *Attorney, Agent, or Firm* — Brooks Kushman P.C.

(57) ABSTRACT

A turbocharger system for a vehicle may include a turbocharger, a tank for compressed gas and an exhaust manifold conduit in fluid communication with an inlet of the turbocharger. The tank is in fluid communication with the manifold conduit and is arranged to push compressed gas into the manifold conduit during a predetermined pulse duration time period for initial compressor spin up in the turbocharger.

19 Claims, 2 Drawing Sheets

(56) References Cited

U.S. PATENT DOCUMENTS

| | | | |
|---|---|---|---|
| 2010/0086414 A1* | 4/2010 | Tai | 417/34 |
| 2010/0139266 A1* | 6/2010 | Gerum | 60/600 |
| 2011/0014067 A1* | 1/2011 | Mayr | 417/364 |
| 2011/0288715 A1* | 11/2011 | Schaffeld et al. | 701/29 |
| 2012/0240909 A1* | 9/2012 | Geyer | 123/559.1 |
| 2013/0305716 A1* | 11/2013 | Rollinger et al. | 60/605.2 |
| 2015/0377157 A1* | 12/2015 | Almkvist | F02D 41/0007 60/606 |

FOREIGN PATENT DOCUMENTS

| | | | |
|---|---|---|---|
| DE | 102007059145 A1 * | 6/2009 | |
| DE | 102010053057 A1 * | 6/2012 | |
| EP | 0531277 A2 * | 8/1992 | |
| EP | 1908937 A1 | 4/2008 | |
| EP | 2184463 A1 | 5/2010 | |
| EP | 2667006 A1 * | 5/2012 | |
| FR | 2836181 A1 | 8/2003 | |
| FR | 2916238 A1 * | 11/2008 | |
| GB | 2121474 A * | 12/1983 | |
| JP | 2012184738 A * | 9/2012 | |
| WO | WO 2010067447 A1 * | 6/2010 | |

OTHER PUBLICATIONS

English Translation of EP0531277.*

Extended European Search Report Dated Apr. 29, 2013, Application No. 12199687.0-1603, Applicant Volvo Car Corporation, 5 Pages.

* cited by examiner

TURBOCHARGER

CROSS-REFERENCE TO RELATED APPLICATIONS

This application claims foreign priority benefits under 35 U.S.C. §119(a)-(d) to European patent application number EP 12199687.0, filed Dec. 28, 2012, which is incorporated by reference in its entirety.

TECHNICAL FIELD

The disclosure relates to a turbocharger system for a vehicle.

BACKGROUND

In vehicles of today it is common to use an exhaust driven turbocharger for compressing air to an inlet manifold of an engine. The turbocharger revs up dependent on the exhaust flow, which in turn is dependent on engine speed and engine torque. Hence, turbocharger response is a well-known problem with turbocharger engines at low engine speeds. This problem becomes worse with the new technologies to reduce $CO_2$, downspeeding and downsizing with increased boost due to the fact that it needs more energy to build up the higher boost pressure. The response problem is a limiting factor in $CO_2$ reduction especially in real world driving due to that an acceptable drivability of the vehicle needs an amount of power margin to handle instant power demands without need of gear shifting, The instant power demands may be from road inclination, small accelerations, accessories, etc.

It is known to use various compressors connected to the inlet manifold for response assistance by feeding air to the inlet side before the turbocharger has revved up. The mechanical compressor is complex, expensive, has low durability, NVH (Noice, Vibrations, Harshness) problems, difficult to control and is noisy.

There is thus a need to find a solution that is cost efficient, durable, produces low noise and improved response.

SUMMARY

An object of the disclosure is to remedy the problems described with prior art by improving turbocharger response with initial compressor spin up by pushing compressed gases from a tank into an exhaust manifold or a manifold conduit connected to the exhaust manifold and the turbocharger inlet. The exhaust manifold may be connected to the manifold conduit or the manifold conduit may be a part of the exhaust manifold. The gas is pushed as a pulse during a time period being approximately 0.1-0.2 s dependent on a number of factors such as, for example, turbocharger size, pressure of the pulse, engine size of gas conduits and other factors that will be exemplified below. Both the power of the pulse and the time interval may vary dependent on desired engine and turbocharger behavior. Hence, the time period may be shorter than 0.1 s and longer than 0.2 s.

It is the power of the pulse that is important for the response, not the energy. According to one example of the disclosure 12 kW is added during 0.1 s to the exhaust manifold. This spins up the turbo typically during 0.1 s and after 0.2 s the engine produces all turbo energy. Recharge time for the tank is needed for full effect, but improved response is always available even if the tank is not fully loaded. The reason is that the turbo always spins up if the tank pressure is high enough to create a pulse that generates an increase in pressure in the exhaust manifold.

A major advantage with a system according to the disclosure is that it is possible to implement on any existing turbocharger system, by simply adding the tank system to the exhaust manifold or conduit.

The tank may be refilled by using a small compressor that may be driven by electricity or any other suitable means. Alternative refilling of the tank is possible, for example use of exhaust gas. The exhaust gas may be used to drive a compressor or may itself be the gas to be used in the tank. The use of exhaust gas for loading may be allocated to time periods during blowdown peaks. One option is to use a valve, preferably a reed valve that is controlled to open during blowdown peaks to at least partly fill the tank. Such a solution could charge the tank with approximately 1 bar higher than the average exhaust manifold back pressure. The valve could also be controlled to close when the pressure in the tank exceeds the exhaust gas counter pressure from the engine, typically in the region about 1-3 bar.

The recharge of the tank may be done by recapturing the initial exhaust manifold backpressure build up during a predetermined time, typically 0.5-2 sec. depending of the exhaust back pressure build up.

The opening time of the tank valve should also be optimized on several parameters, for example:

Reducing exhaust contamination of valve and tank.
Allocate possible opening when back pressure is higher than tank pressure.
Increase system voltage to improve recharge time.
Controlling the amount of turbo speed up by partly emptying the tank.
History to detect non steady state conditions such as higher turbo speed caused by a recently acceleration.

Furthermore, it is an alternative to use the load pressure from a two-step turbocharger to at least partly refill the tank.

When introducing the compressed gas into the exhaust manifold or exhaust conduit, there is on a 4 cylinder engine always at least one exhaust valve open to one cylinder. The introduction of compressed gas affects the cylinder(s) associated with the open valve such that the engine revs up less than compared to if no gas would have been introduced. At the same time the introduction of gas revs up the turbocharger. Should the compressed gas be cold air, the introduction of cold gas into the cylinder(s) would expand due to the heat in the engine which would further increase the pressure in the exhaust manifold and the exhaust conduit such that the turbocharger revs up even more than if the gas would have been hot.

The system comprises a tank valve connected to the tank for controlling the gas flow from the tank. The tank valve may be operated by an electrical, hydraulic or mechanical regulating means for opening and closing the valve. The tank valve may also be arranged to control the flow of gas to the tank, but as an alternative a second valve or opening could be connected to the tank for controlling the flow of gas to the tank. The system also comprises a control unit for controlling the tank valve. The control unit may be connected to a pulse regulation unit for regulating the pulse duration time period.

Parameters that may control the tank valve:
For example, throttle movement and/or throttle position.
For example, turbocharger RPM, wherein the valve opening is closed when the turbocharger has an RPM (Rotation Per Minute) above a predetermine threshold. It is not necessary to measure RPM, but any substitute for evaluating the rotational speed could be used. Ambient conditions, road friction, vehicle speed, actual gear selected or shifting mode may be used to control the tank valve.

It may also be possible to inhibit or delay the pulse at parking maneuvers and gear shift.

A system according to the disclosure may be especially beneficial during takeoff starts, i.e., when the vehicle is standing still or moving at low engine speeds and the driver makes a fast press down of the accelerator pedal indicating a wish to have a fast acceleration, and the turbocharger has not revved up enough to the give the engine the necessary air load to the inlet to create a turbo boost.

A system according to the disclosure improves the takeoff in such a way that it may be comparable to a scenario with stalling start, i.e., when car stands still and the driver breaks and at the same time puts the gas on, so that the engine and turbocharger revs up before the takeoff.

The system comprises a tank pipe connected between the tank valve and the exhaust manifold or exhaust conduit. The volume and pressure of the tank contra diameter and length of the pipe are essential design parameters since the volume and pressure gives the energy and the pipe diameter acts as a choke for increasing or decreasing the possible amount of gas to be exerted during the pulse for a given volume and pressure.

A large turbocharger may be an important design parameter when downsizing an engine because a large turbocharger can produce more air flow and thereby gives a higher peak power of the engine. However, a large turbocharger has an increased problem with response compared to a smaller turbocharger, but with a system according to the disclosure the larger turbocharger revs up well before the engines enthalpy has revved up the turbo. Hence, a system according to the disclosure may give the advantage of eliminating the response problem with large turbochargers with high load pressure which in turn allows for downsizing engines, i.e., making the engine smaller and which in turn gives less fuel consumption.

A system according to the disclosure may be highly advantageous at high altitude where the ambient air has a low pressure which gives a small amount of exhaust gas enthalpy which in turn inhibits the possibility for the turbocharger to rev up. With a system according to the present disclosure the introduction of compressed air to the exhaust manifold or exhaust conduit revs up the turbocharger which in turn compresses the ambient air to the engine which in turn is revved up in such a way that it produces exhaust gas to drive the turbocharger which has the benefit that the rev up may be comparable to that at low altitudes.

Furthermore, due to the quick response of the turbocharger it is possible to change gear shift schedule for down speeding, i.e., lower engine RPM but higher instant momentum is available which is an effect of faster rev up to high load pressure. The advantage is less ware and friction and thus less fuel consumption. The lower engine speed also emits lower noise increasing the interior and exterior comfort.

Another advantage of a system according to the disclosure is the quick response during start and stop, where the shut off engine needs extra-long time to rev up due to lower enthalpy caused by the lower engine speed and colder exhaust system during start phase. A system according to the disclosure may rev up the turbo similar to as if the engine was in idling mode.

Since the tank needs some time to be recharged there will be different rev up effects if a repeated acceleration is performed within the recharge time. After an acceleration using a system according to the disclosure, when the tank was fully or partly emptied, the turbocharger revs up and due to the mass momentum of the spinning compressor in the turbocharger the compressor will continue to spin with high RPM during several seconds. The high RPM of the turbocharger is beneficial during next start, and dependent on set valve tank parameters the opening of the tank valve may be inhibited should the turbocharger already spin with a speed above the predetermined threshold value. As an alternative to measuring the turbocharger rotational speed, it is possible to calculate turbocharger rotational speed after an initial pulse deceleration to determine pulse duration.

Cold start: It is possible to use a system according to the disclosure during cranking as soon as the engine or parts of the engine have fired. By introducing the compressed gas into the exhaust manifold or exhaust conduit, the turbocharger revs up and pushes compressed air fuel to the cylinders such that the known problem of low torque with low RPM during cold weather is avoided.

A system according to the disclosure is possible to use on all vehicles independent on fuel choice, but when driving on gasoline and introducing air into the exhaust manifold or exhaust conduit it is advantageous to drive the engine below lambda 1 during a short period before, during and after the pulse. The reason is to compensate for the fact that oxygen may enter into the catalyst via the exhaust manifold or exhaust conduit, which may damage the catalyst function if too much oxygen is introduced to the catalyst.

According to one example of the disclosure it is possible to use the compressor and the tank in the air suspension system as a gas tank. In a normal car of medium size today, today a tank may hold 6 liters and 13 bar. The tank valve then is connected to the tank either directly or via a conduit.

Should the compressor and tank be separate units for the introduction of air into the exhaust manifold or exhaust conduit, other unit could be removed or eliminated in the design, for example the tire compressor can be eliminated for a spare.

A minor fuel consumption penalty exists from recharging. As an example, if recharge occurs once every 2.5 km the penalty is around approx. 0.3% if the extra load is added to the engine.

The tank may be a Fire extinguisher type preferably made from stain resistive steel or aluminum. A tank drainage outlet is advantageously positioned at the bottom of the tank in order to drain water.

Charging of the tank by a small compressor typically 300 W: The compressor could be placed in an engine compartment "cold zone" or in an air intake system for cooling. Typical recharge time may be 50% after 10 seconds and 90% after 25 seconds. The tank may be recharged by use of air from air filter or interior cabin for clean air.

The tank valve may be of a fast on/off type which is electrically controlled, or fast and slow in series or parallel to control pulse, or a combination with pneumatic chassis suspension, compressor and charge tank, or air pressure for brake system.

The system may comprise a check valve connected to the tank in order to assure that a pressure above a set value is released as a precaution.

The tank valve is connected to the exhaust manifold or exhaust conduit with a pipe of typically 15 mm diameter and which pipe is positioned upstream of the turbocharger with reference to the exhaust gas flow direction. The exhaust gas flow direction is in a direction from the engine to the turbocharger.

The regulating means is controlled by the control unit typical tank release time is 0.1-0.2 sec. Control of engine power is done by the pressure pulse which is a function of valve opening duration time typically on/off with 50 ms steps.

Tank valve opening duration may be a function of one or more of pedal-position, -derivative, engine load and speed, coolant temp, vehicle speed, gear, ambient temperature, altitude, gear shift, accessories on/off, condition in pressure tank.

Furthermore, the control function may also be a function of GPS position, driver behavior, etc.

The condition in the tank, such as change by heat up, cold/hot start, state of charge etc. may be detected by direct or indirect by using sensors such as pressure, temperatures. It may be possible to replace pressure gauge, temp sensor and safety valves with software functions.

If emission control is needed it is possible to compare the supplied oxygen during the pulse with the catalyst oxygen buffer, enriching air/fuel mix before and during pulse to restore catalyst buffer.

It may also be possible to enrich the air/fuel mixture to handle initial knock on petrol engine and smoke limiter control to improve torque/emission control on diesel engines.

Diagnosis to detect fault or leakage I pulse system may be performed by adding or using existing sensors such as inlet pressures, temperature and lambda sensors.

Safety: 1 L at 15 bar contains approximately 2 kJ energy which corresponds to 0.7 g gun powder (3 kJ/g) which is comparable to a small fireworks banger.

According to one example of the disclosure, the following parameters are valid:
Compressed Air Pressure in the tank 6-10 bar;
Tank volume: 1-2 L;
12V Compressor around 200-400 W;
Pulse duration: 0.1-0.2 sec;
Dump valve/pipe diameter 10-15 mm;
Dump valve control: electric valve controlled by a control unit;
Typical response are 0.4 bar boost pressure within 0.4 sec;
Recharge control by using the increasing back pressure to initial fill recharge time typically 10-20 s.

According to another example aiming to a more powerful response but a longer recharge time the following parameters are valid:
Compressed Air Pressure in the tank 10-15 bar;
Tank volume: 4-6 L;
12V Compressor around 400-600 W;
Pulse Duration: 0.1-0.3 sec;
Dump valve/pipe diameter 15-25 mm;
Dump valve control: electric valve controlled by a control unit;
Typical response are 1.4 bar boost pressure within 0.4 sec;
Recharge control by using the increasing back pressure to initial fill recharge time typical 30-60 s.

Yet another example:
2.0 L 5 cylinders Diesel engine, a 2.3 L tank with 7.5 bar air pressure, and a 400 W electric compressor;
80% of the air tank is released during 0.1 s, the turbo speed increases 100000 rpm in 0.2 s;
Boost pressure is 0.5 bar after 0.3 s and the vehicle acceleration after 0.5 s is over 5 m/s2;
Wheel spin occurs after 0.6 s.

A system according to the disclosure makes a very good combination with a torque converter allowing the engine to reach speeds with max torque available.

The tank valve may be arranged to be controlled in such a way that only a part of the pressure is released from the tank during one or more pulsations. The benefit is that the engine response can be controlled with the pulse(s). During the release, the tank valve is arranged to perform one or more opening events, i.e., one or more pulsations. The pulsations correspond to the tank valve opening time and it has proven advantageously that at least one opening time is longer than 50 ms in order to protect the on/off controlling.

The tank valve may also be controlled in such a way that only a part of the pressure is released. The tank valve may be arranged to open only a part of max open area in order to control the engine response with the valve opening area.

BRIEF DESCRIPTION OF THE DRAWINGS

An embodiment according to the disclosure is described below in connection with a number of drawings, in which.

DETAILED DESCRIPTION

Figure 1:
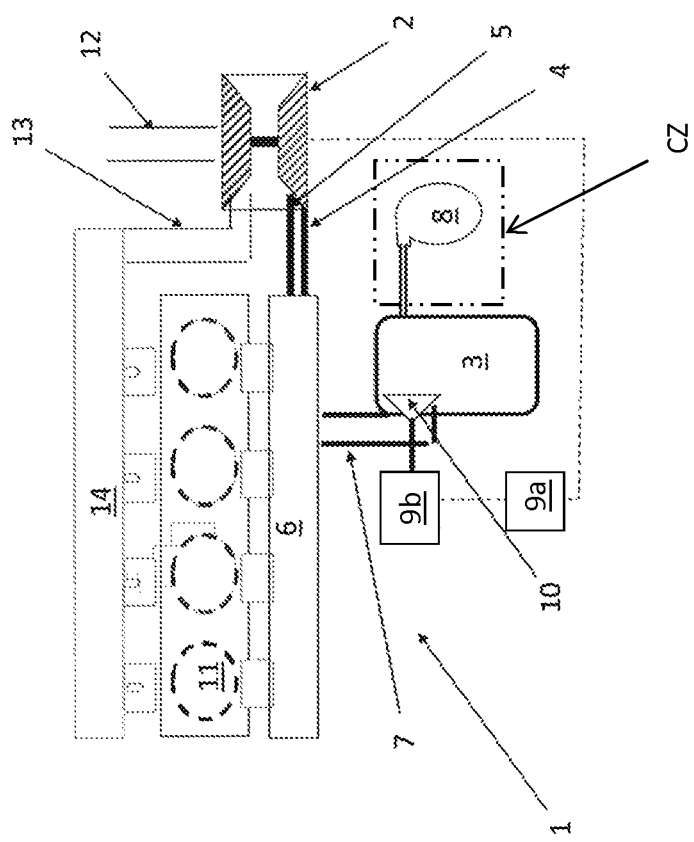
FIG. 1 schematically shows an engine with a turbocharger system according to the disclosure.

FIG. 1 schematically shows a turbocharger system 1 for a vehicle according to the disclosure. The system comprises a turbocharger 2, a tank 3 for compressed gas and an exhaust manifold conduit 4 being in fluid communication with an inlet 5 of the turbocharger 2. The tank 3 is in fluid communication with the manifold conduit 4. The tank 3 is arranged to push compressed gas into the manifold 6 and thereby the conduit 4 during a predetermined pulse duration time period for initial turbine and compressor spin up in the turbocharger 2.

FIG. 1 shows that the system comprises an exhaust manifold 6 in fluid communication with the exhaust conduit 4. In FIG. 1 the tank 3 is connected to and in fluid communication with the exhaust manifold 6 via a pipe 7. The tank may however be connected directly to the exhaust conduit 4 via the pipe 7, or to any other part of the exhaust manifold system being in fluid communication with the turbocharger 2. In FIG. 1, the tank 3 is arranged to push compressed gas into the exhaust manifold 6 during a predetermined pulse duration time period for initial compressor spin up in the turbocharger 2.

FIG. 1 shows a tank 3 that is rechargeable by use of a compressor 8 for compressing air into the tank 3. The compressed gas may be air, exhaust gas or any other suitable gas. The compressor 8 could be placed in an engine compartment "cold zone" CZ or in an air intake system for cooling. Typical recharge time may be 50% after 10 seconds and 90% after 25 seconds.

FIG. 1 shows that the system comprises a control unit 9a connected to a pulse regulation unit for regulating the pulse duration time period.

FIG. 1 shows that the system comprises a tank valve 10 connected to the tank 3, wherein the tank valve 10 is controlled by the pulse regulation unit 9b.

FIG. 1 shows the basic principle of the turbocharger 2, where the turbocharger 2 is driven by exhaust gas from an engine 11 and where the turbocharger compresses air from an air intake 12 into the engine 11 via an inlet 13 and inlet manifold 14 of the engine 11.

Figure 2:
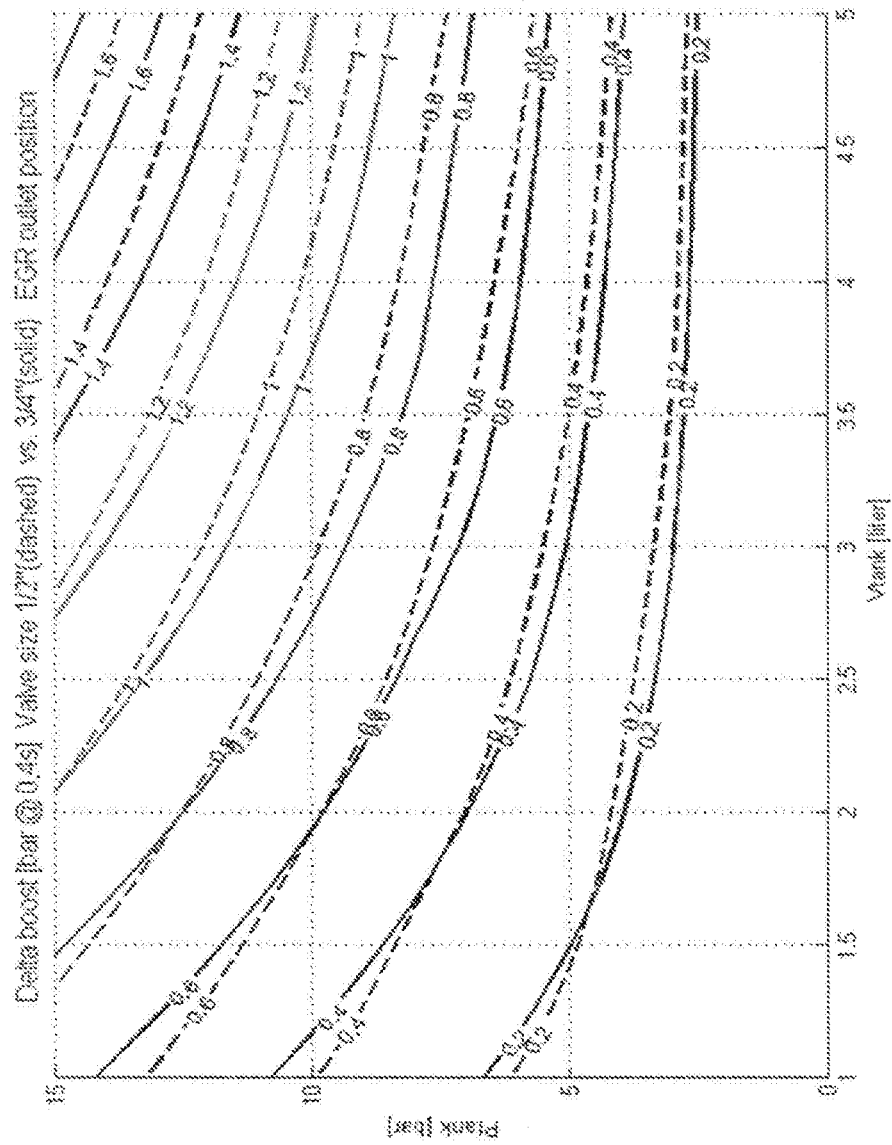
FIG. 2 shows a diagram over different tank volumes, tank pressures, pipe diameters and delta pressure during a predetermined time period.

FIG. 2 shows a diagram over different tank volumes, tank pressure, pipe diameters and boost pressure during a predetermined time period. FIG. 2 shows a diagram of an example where the tank valve has been open 0.4 seconds for different tank volumes (X-axis), tank pressures (Y-axis) and different sizes of the pipe. The dashed lines represent a pipe with a diameter of 12.7 mm and the solid lines represent a pipe with a diameter of 19.05 mm. In the diagram, the numbers connected to the different lines represent boost pressure for the given parameters. The boost pressure is the difference in pressure before and after the compressor 0.4 seconds after the pulse is activated.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A turbocharger system for a vehicle, the system comprising:
    a turbocharger having an inlet;
    a tank for compressed gas;
    a tank valve connected to the tank and being actuatable to release the compressed gas from the tank for a predetermined pulse duration period of 0.1-0.2 seconds for initial compressor spin up in the turbocharger;
    an exhaust manifold conduit in fluid communication with the inlet of the turbocharger;
    wherein the tank is in fluid communication with the exhaust manifold conduit, and
    the tank valve is arranged to be controlled to release the compressed gas from the tank into the exhaust manifold conduit during the predetermined pulse duration time period.

2. A system according to claim 1 further comprising an exhaust manifold in fluid communication with the exhaust manifold conduit, wherein the tank is in fluid communication with the exhaust manifold, and wherein the tank is arranged to provide compressed gas into the exhaust manifold during a predetermined pulse duration time period for initial compressor spin up in the turbocharger.

3. A system according to claim 1 wherein the tank is rechargeable.

4. A system according to claim 1 further comprising a compressor for compressing air into the tank.

5. A system according to claim 4 wherein the compressor is an electric compressor.

6. A system according to claim 4 wherein the compressor and tank are part of a pneumatic chassis suspension and/or air pressure brake system.

7. A system according to claim 4 wherein the compressor is positionable in an engine compartment cold zone or in an air intake system.

8. A system according to claim 1 wherein the compressed gas is air.

9. A system according to claim 1 wherein the compressed gas comprises exhaust gas.

10. A system according to claim 2 wherein the tank is configured to receive exhaust gas from the exhaust manifold.

11. A system according to claim 1 further comprising a control unit connected to a pulse regulation unit for regulating the pulse duration time period.

12. A system according to claim 11 wherein the tank valve is controllable by the pulse regulation unit.

13. A system according to claim 12 wherein the tank valve is arranged to be controlled to close when pressure in the tank exceeds exhaust back pressure.

14. A system according to claim 12 wherein the tank valve is controllable dependent on throttle movement and/or throttle position.

15. A system according to claim 12 wherein the tank valve is arranged to be controlled to close when the turbocharger has an RPM above a predetermined threshold.

16. A system according to claim 12 wherein the tank valve is arranged to be controlled in such a way that only a part of pressure in the tank is released from the tank, and wherein the tank valve during the release is arranged to perform one or more opening events.

17. A system according to claim 16 wherein the tank valve is arranged to be controlled in such a way that the at least one opening time is longer than 50 ms.

18. A vehicle comprising:
    an engine;
    a turbocharger having an inlet, the turbocharger being drivable by exhaust gas from the engine;
    a tank for compressed gas;
    a tank valve connected to the tank and being actuatable to release the compressed gas from the tank for a predetermined pulse duration period of 0.1-0.2 seconds for initial compressor spin up in the turbocharger; and
    an exhaust manifold conduit in fluid communication with the inlet of the turbocharger;
    wherein the tank is in fluid communication with the exhaust manifold conduit, and the tank valve is arranged to be controlled to release the compressed gas from the tank into the exhaust manifold conduit during the predetermined pulse duration time period.

19. A turbocharger system for a vehicle, the system comprising:
    a turbocharger having an inlet;
    a tank for compressed gas;
    a tank valve connected to the tank and being actuatable to release the compressed gas from the tank for a predetermined pulse duration period of 0.1-0.2 seconds for initial compressor spin up in the turbocharger;
    a pulse regulation unit for controlling the tank valve; and
    an exhaust manifold conduit in fluid communication with the inlet of the turbocharger;
    wherein the tank is in fluid communication with the exhaust manifold conduit, and the pulse regulation unit is configured to control the tank valve to release the compressed gas from the tank into the exhaust manifold conduit during the predetermined pulse duration time period.

* * * * *